United States Patent [19]

Makino

[11] Patent Number: 4,939,770
[45] Date of Patent: Jul. 3, 1990

[54] CORDLESS TELEPHONE WITH BATTERY SAVING FUNCTION

[75] Inventor: Masayuki Makino, Tokyo, Japan

[73] Assignee: NEC Corporation, Tokyo, Japan

[21] Appl. No.: 220,145

[22] Filed: Jul. 18, 1988

[30] Foreign Application Priority Data

Jul. 16, 1987 [JP] Japan .................. 62-178285

[51] Int. Cl.⁵ .............................................. H04Q 7/04
[52] U.S. Cl. ............................. 379/61; 379/58;
455/127; 455/343
[58] Field of Search .............. 320/13; 379/58, 63;
455/127, 343

[56] References Cited

U.S. PATENT DOCUMENTS

| | | | |
|---|---|---|---|
| 4,458,111 | 7/1984 | Sugihara | 379/61 |
| 4,479,125 | 10/1984 | Mori | 455/343 |
| 4,593,155 | 6/1986 | Hawkins | 379/62 |
| 4,639,549 | 1/1987 | Hirayama et al. | 379/62 |
| 4,656,653 | 4/1987 | Oda et al. | 379/61 |
| 4,726,052 | 2/1988 | Kato et al. | 455/127 |
| 4,736,404 | 4/1988 | Anglikowski et al. | 379/62 |
| 4,755,816 | 7/1988 | DeLuca | 455/343 |
| 4,761,806 | 8/1988 | Toki | 379/61 |

FOREIGN PATENT DOCUMENTS 0218482 4/1987 European Pat. Off. ............. 379/58

*Primary Examiner*—Robert Lev
*Attorney, Agent, or Firm*—Sughrue, Mion, Zinn, Macpeak & Seas

[57] ABSTRACT

A cordless telephone system includes a fixed unit and a portable unit which communicate with each other over a radio link. The portable unit includes a rechargeable battery, and a battery saving device for interrupting a power supply to predetermined sections of the portable unit in response to a control signal. The fixed unit includes a charging device for converting and AC voltage into a DC voltage to produce a charging voltage, and a detecting device for detecting when the rechargeable battery is being charged by the charging voltage, and for outputting a detection signal in response thereto. The fixed unit further includes a supplying device which is responsive to the detection signal for outputting the control signal and for supplying the control signal to the portable unit together with the charging voltage.

26 Claims, 4 Drawing Sheets

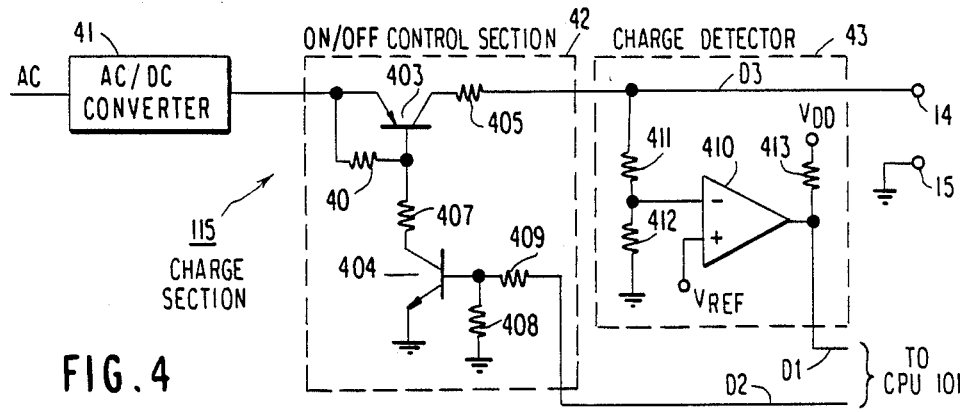
FIG.4
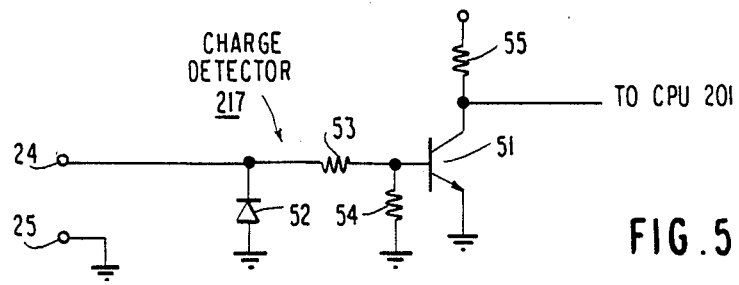
FIG.5
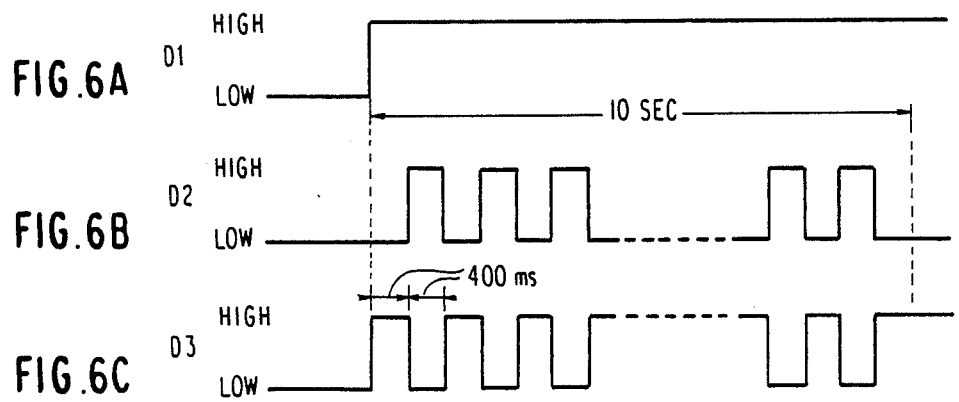
FIG.6A
FIG.6B
FIG.6C

CORDLESS TELEPHONE WITH BATTERY SAVING FUNCTION

BACKGROUND OF THE INVENTION

The present invention relates to a cordless telephone which includes a portable unit and a fixed unit and, more particularly, to a cordless telephone with a capability of saving a battery of a portable unit while it is charged.

A portable unit included in a cordless telephone is usually provided with a rechargeable battery therein. A fixed unit includes a charging section with an altenative current-to-direct current (AC/DC) conversion function which is connected to a commercial AC power source and plays two different roles, i.e., converting an AC voltage to a DC voltage and feeding the DC voltage to the fixed unit and charging the battery of the portable unit. When the portable unit is loaded in the fixed unit, the battery of the portable unit is charged via charge terminals. A separate charger is sometimes used in place of the charging section of the fixed unit. This kind of cordless telephone is disclosed in Japanese Laid-Open Patent Publication (Kokai) No. 62-81135 (Kato et al). This Laid-Open Patent Publication was assigned to the applicants including the applicant of the instant application and laid open Apr. 14, 1987, a corresponding U.S. application being issued Feb. 16, 1988 as U.S. Pat. No. 4,726,052.

The cordless telephone system of Kato et al determines whether a portable unit is being charged and, if it is being charged, conditions a transmitter for a waiting mode automatically, resulting in increasing the radio channel efficiency. However, such a cordless telephone system is not provided with any implementation for saving the battery of the portable unit.

SUMMARY OF THE INVENTION

It is therefore an object of the present invention to provide a cordless telephone with a capability of saving a battery of a portable unit.

It is another object of the present invention to provide a cordless telephone having a portable unit whose battery is selectively chargeable through a fixed unit and by a separate charger, the telephone being capable of power saving the portable unit battery when the portable unit is set in the fixed unit.

It is another object of the present invention to provide a cordless telephone which reduces a charging time when a portable unit is charged by a fixed unit.

In accordance with the present invention, in a cordless telephone including a fixed unit and a portable unit which are communicatable with each other over a radio link, the portable unit comprises a rechargeable battery, and a battery saving circuit responsive to a control signal for interrupting power supply to predetermined sections of the portable unit. The fixed unit comprises a charging circuit for converting an AC voltage into a DC voltage to produce a charging voltage, a detector for, when the battery of the portable unit is charged by the charging voltage, detecting that the battery is being charged and outputting a detect signal, and a supply circuit responsive to the detect signal for outputting the control signal and supplying the control signal to the portable unit together with the charging voltage.

BRIEF DESCRIPTION OF THE DRAWINGS

The above and other objects, features and advantages of the present invention will become more apparent from the following detailed description taken with the accompanying drawings in which:

FIG. 4 is a schematic block diagram representative of a charging section of the fixed unit as shown in FIG. 2;

FIG. 5 is a block diagram representative of a charge detector of the portable unit as shown in FIG. 3;

FIGS. 6A to 6C are waveform diagrams useful for explaining the operations of the charging section and the charge detector as shown in FIGS. 4 and 5, respectively;

DETAILED DESCRIPTION OF THE INVENTION

Figure 1:
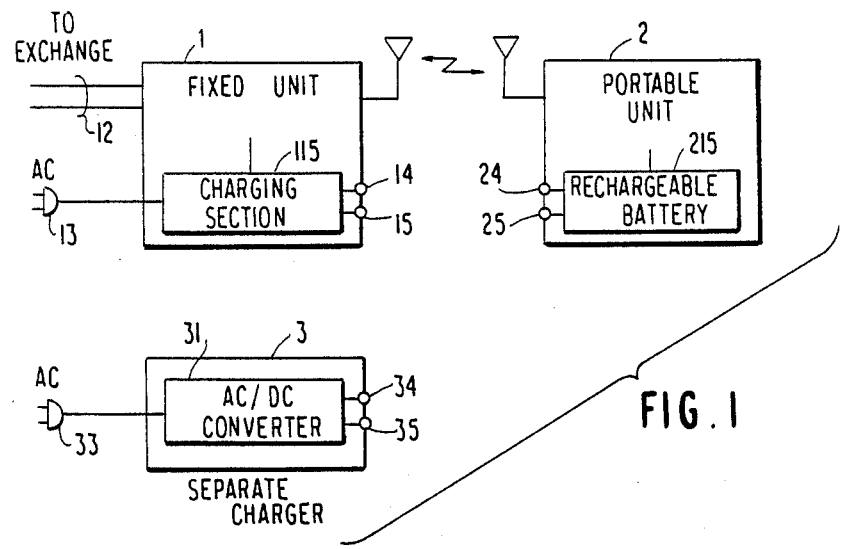
FIG. 1 is a schematic block diagram showing a cordless telephone embodying the present invention.

Referring to FIG. 1 of the drawings, a portable unit 2 is connected by a radio link to a fixed unit 1 which is in turn connected to an exchange (not shown) of a switched telephone network via a subscriber line 12. The fixed unit 1 includes a charging section 115 which is connected to an AC power source via an outlet 13 for converting an AC voltage into a DC voltage. The charging section 115 is adapted to supply a DC voltage to the fixed unit 1 and, when the portable unit 2 is set in the fixed unit 1, to charge a rechargeable battery 215 of the portable unit 2 via terminals 14 and 15 and terminals 24 and 25, as described in detail later. The portable unit 2 may also be set in a separate charger 3 to charge its battery 215 via the terminals 24 and 25 and terminals 34 and 35. The separate charger 3 includes an AC/DC converter 31 which receives AC via an outlet 33 and converts it into DC.

The portable unit 2 performs a battery saving operation when set in the fixed unit 2 and does not perform it when set in the separate charger 3. Specifically, when the portable unit 2 is loaded in the fixed unit 1, the fixed unit 1 senses it and delivers a control signal to the portable unit 2 via the terminals 14 and 15 and terminals 24 and 25. In response, the portable unit 2 enters into a battery saving operation. Such a sequence of steps will become clearer as the description proceeds.

Figure 2:
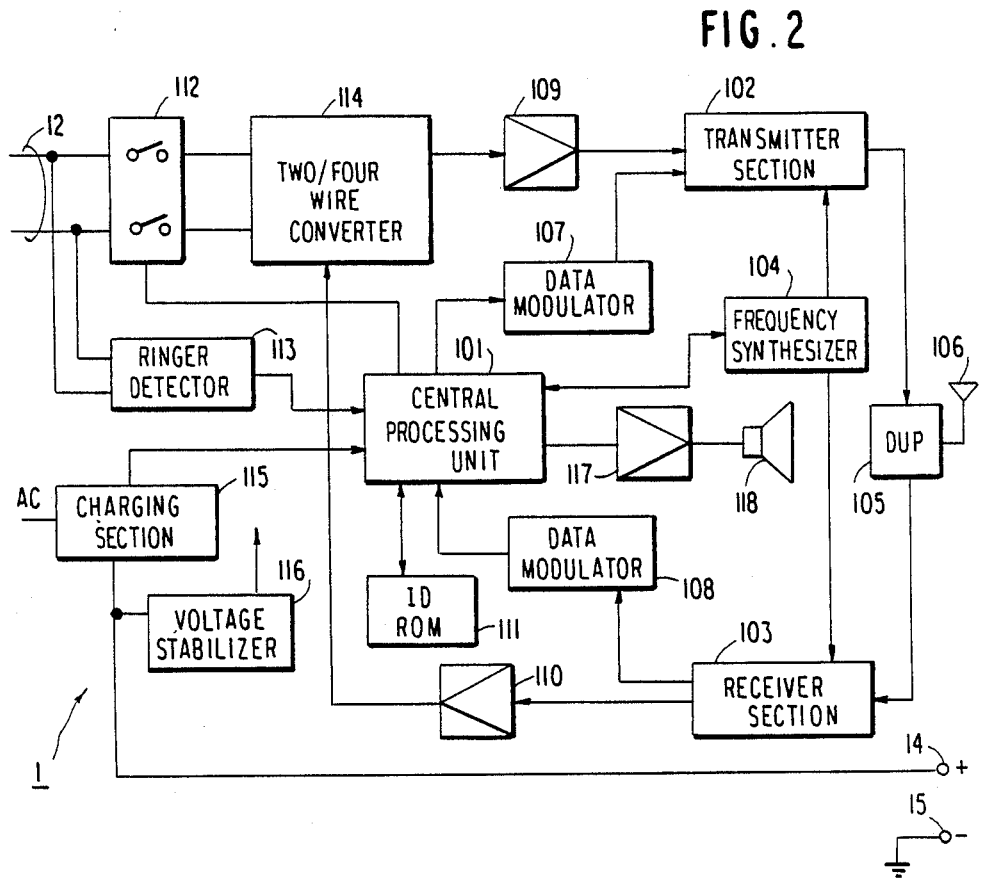
FIG. 2 is a block diagram schematically showing a fixed unit which is included in the cordless telephone of FIG. 1.

Referring to FIG. 2, the fixed unit 1 includes a transmitter section 102 and a receiver section 103 for holding radio communications with the portable unit 2. The transmitter section 102 and receiver section 103 are connected to an antenna 106 via a duplexer 105. A frequency synthesizer 104 produces local oscillation signals for setting up the channels of the transmitter section 102 and receiver section 103 in response to a command from a central processing unit (CPU) 101. Connected to the CPU 101 are a data modulator 107 and a data demodulator 108 which are adapted for the interchange of data with the portable unit 2. The data modulator 107 and the data demodulator 108 are connected to the transmitter section 102 and the receiver section 103, respectively.

An output of the receiver section 103 is routed through an amplifier 110 to a two/four wire converter 114 and via a switch circuit 112 and the subscriber line 12 to the exchange (not shown). A signal from the exchange is fed to the transmitter section 102 by way of the subscriber line 12, switch circuit 112, two/four wire converter 114, and an amplifier 109. A ringer detector 113 serves to sense a ringing signal and inform the CPU 101 of the arrival of a call. In response, the CPU 101 notifies the portable unit 2 of the arrival of a call while, at the same time, enabling an amplifier 117 to drive a loudspeaker 118 to produce an alert tone for alerting the user to it. An identification read-only memory (ID ROM) 111 stores therein a particular ID number which is assigned to the fixed unit 1. The operation of the fixed unit 1 described so far is well known in the art and, therefore, will not be explained any further to avoid redundancy.

As will be described in detail later, the charging section 115 includes an AC/DC converter and applies a DC voltage to a voltage stabilizer 116 as well as to the terminals 14 and 15. The voltage stabilizer 116 converts the input DC voltage into voltages which are necessary for various parts of the fixed unit 1 and delivers the resulting voltages to them. The charging section 115 further includes a charge detector. When the charge detector detects that the portable unit 2 is being charged, the charging section 115 reports it to the CPU 101. Then, the CPU 101 delivers a control signal to the charging section 115 for controlling it to repeatedly turn on and off the charge output voltage for a predetermined period of time. Thus, an intermittent control signal or synchronizing signal is supplied to the portable unit 2 via the terminals 14 and 15.

Figure 3:
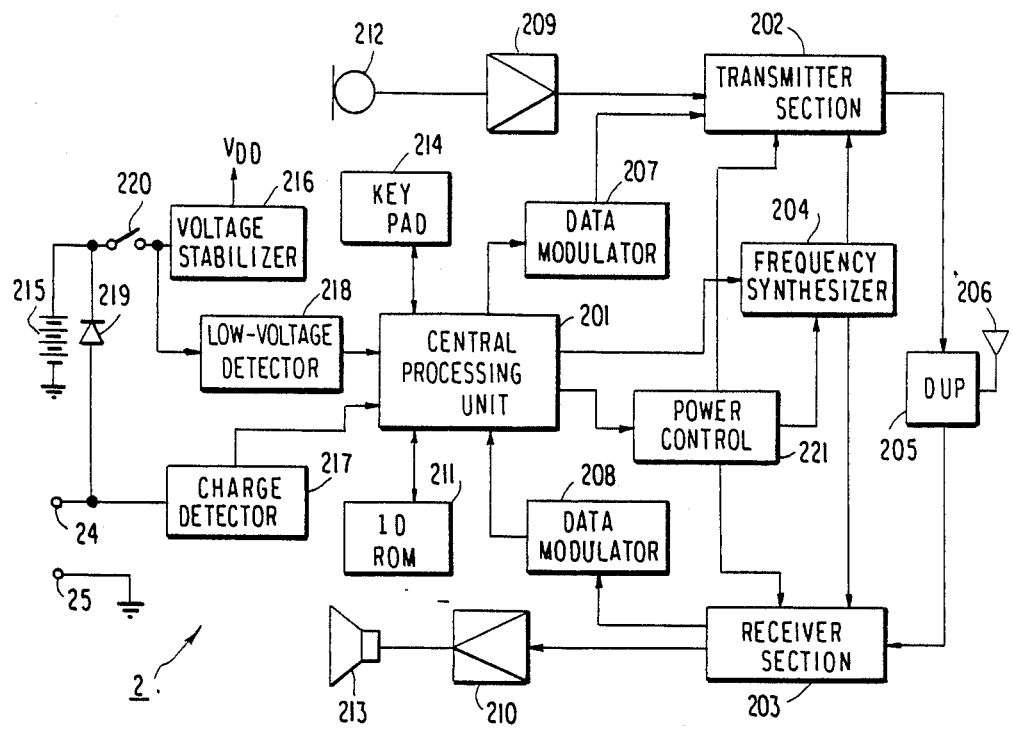
FIG. 3 is a block diagram schematically showing a portable unit which is also included in the cordless telephone of FIG. 1.

Referring to FIG. 3, the portable unit 2 includes a CPU 201. The portable unit 2 further includes a transmitter section 202, a receiver section 203, a frequency synthesizer 204, a duplexer 205, an antenna 206, a data modulator 207, a data demodulator 208, amplifiers 209 and 210, and an ID ROM 211 which individually correspond to those of the fixed unit 1. In addition, the portable unit 2 is provided with a handset 212 and 213, and a keypad 214. Such a construction of the portable unit 2 is also well known in the art and, therefore, details thereof will not be described.

The rechargeable battery 215 is charged either by the charging section 115 (FIG. 2) of the fixed unit 1 or by the separate charger 3 (FIG. 1) via the charge terminals 24 and 25 and a diode 219 which serves to block reverse flows of current. The output voltage of the battery 215 is applied to the voltage stabilizer 216 via a power switch 220 to be thereby convert the output voltage of battery 215 into required voltages which are fed to various parts of the portable unit 2. A low-voltage detector 218 is responsive to the output voltage of the battery 215 and, when it is lowered beyond a predetermined level, informs the CPU 201 of such a voltage drop and thereby notifies the user of the need for charging the battery 215.

A charge detector 217 senses the intermittent control signal which is fed from the fixed unit 1 prior to charging as stated earlier and feeds the intermittent control signal to the CPU 201, as described more specifically later. When the CPU 201 receives the intermittent control signal for more than a predetermined period of time (e.g. 8 seconds), it decides that the portable unit 2 is being charged by the fixed unit 1 and activates a power control 221 to shut off the supply of source voltage to the transmitter section 201, receiver section 203, and frequency synthesizer 204. This brings the portable unit 2 into a battery saving mode in order to save the battery life and to reduce the charging time of the battery 215. Although an incoming call cannot be received on the portable unit 2 in the battery saving mode, this does not matter at all because the loudspeaker 118 (FIG. 2) is installed in the fixed unit 1 to alert the user to it.

As shown in FIG. 4, the charging section 115 includes an AC/DC converter 41, an ON/OFF control section 42, and a charge detector 43. The ON/OFF control section 42 includes a transistor 403, a resistor 405 connected to the collector of the transistor 403, a resistor 40 connected between the base and emitter of the transistor 403, and a resistor 407 connected at one end thereof to the base of the transistor 403. Connected to the other end of the resistor 407 is the collector of a transistor 404. The emitter of the transistor 404 is connected to ground while the base of the transistor 404 is connected to a junction of resistors 408 and 409. The other end of the resistor 408 is connected to ground and the other end of the resistor 409 is connected to the CPU 101.

The charge detector 43 includes a resistor 411 which is connected at one end to the resistor 405 and the terminal 14 and at the other end to a one end of register 412 and an inverting input of an operational amplifier (OP AMP) 410. The other end of the resistor 412 is connected to ground. The OP AMP 410 has a non-inverting input being connected to a reference voltage source $V_{REF}$ and an output being connected to the CPU 101 and, via a pull-up resistor 413, to the power source voltage $V_{DD}$.

In operation, the DC output voltage of the AC/DC converter 41 is applied to the terminal 14 via the transistor 403 and resistor 405. The voltage appearing on the terminal 14 is divided by the resistors 411 and 412 and then fed to the inverting input of the OP AMP 410. It is obvious that the divided voltage is proportional to the DC voltage at the terminal 14. The OP AMP 410 compares the divided voltage with the reference voltage $V_{REF}$ to deliver a detect signal D1 to the CPU 101. The detect signal D1 has a high level when the divided voltage is higher than the reference voltage $V_{REF}$ and a low level when the former is lower than the latter. The reference voltage $V_{REF}$ has a value which is selected as follows. Assuming that the voltage appearing on the terminal 14 is $V_{01}$ (e.g. 5 volts) when the portable unit 2 is set in the fixed unit 1 and $V_{02}$ (e.g. 15 volts) when the former is not set in the latter and not charged, the reference voltage $V_{REF}$ is expressed as:

$$\frac{R_2}{R_1 + R_2} V_{01} < V_{REF} < \frac{R_2}{R_1 + R_2} V_{02}$$

where $R_1$ and $R_2$ are representative of the resistance values of the resistors 411 and 412, respectively.

When the detect signal D1 becomes a high level as shown in FIG. 6A, the CPU 101 decides that the portable unit 2 has been set in and begun to be charged by the fixed unit 1 and delivers an intermittent control signal D2 as shown in FIG. 6B to the base of the transistor 404 via the dividing resistors 408 and 409. This signal D2 may have a pulse width of 400 milliseconds and a pulse interval of 400 milliseconds and continue for 10 seconds. The transistor 404 becomes conductive when the signal D2 has a high level and non-conductive when it has a low level. The transistor 403 is rendered conductive when the transistor 404 becomes conductive and non-conductive when it becomes non-conductive, causing a charge voltage D3 to vary as shown in FIG. 6C. In this manner, an intermittent control signal (synchronizing signal) D3 is fed from the fixed unit 1 to the portable unit 2 via the terminals 14 and 15.

As shown in FIG. 5, the charge detector 217 responds to the synchronizing signal D3 by informing the CPU 201 of the above condition. The terminals 24 and 25 which are to be respectively connected to the charging terminals 14 and 15 of the fixed unit 1 are connected to a resistor 53 and ground, respectively. Also, the terminal 24 is connected to ground via a diode 52. The other end of the resistor 53 is connected to one end of a resistor 54 the other end of which is connected to ground. The junction of the resistors 53 and 54 is connected to the base of a transistor 51. The collector of the transistor 51 is connected to the CPU 201 and via a pull-up resistor 55 to the power source voltage $V_{DD}$, and the emitter of the transistor 51 is connected to ground.

In operation, the synchronizing signal D3 (FIG. 6C) from the fixed unit 1 is divided in voltage by the resistors 53 and 54 and then applied to the base of the transistor 51. The transistor 51 becomes conductive and non-conductive when the control signal has a high level and a low level, respectively. Timed to the conduction and non-conduction of the transistor 51, a signal similar to the signal D3 of FIG. 6C is fed to the CPU 201. This signal informs the CPU 201 of the fact that the portable unit 2 has been set in and charged by the fixed unit 1. Then, the CPU 201 causes the power control 221 (FIG. 3) to turn off the transmitter 202, receiver 203, and frequency synthesizer 204, entering into a battery saving mode. It is to be noted that the diode 52 is a limiter diode for protecting the transistor 51 against damage otherwise caused by surge and others applied to the terminal 24.

Figure 7:
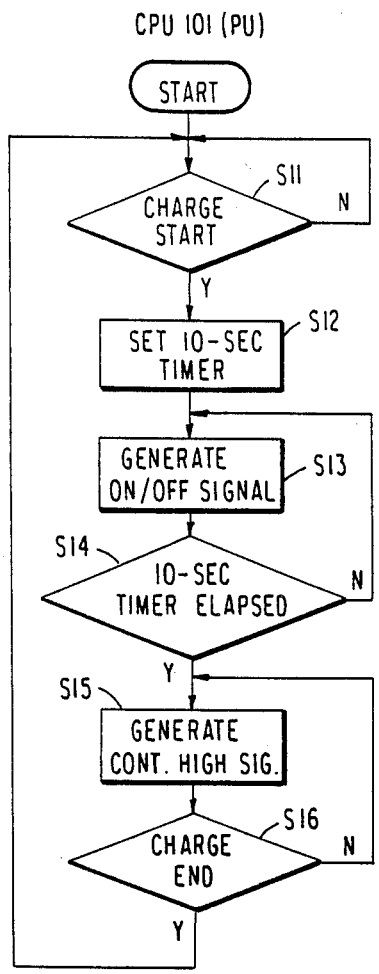
FIG. 7 is a flowchart demonstrating the operation of a central processing unit (CPU) which is included in the fixed unit of FIG. 2.

A reference will be made to FIG. 7 for describing the operation of the CPU 101 of the fixed unit 1 in detail. The CPU 101 advances from a waiting condition of the fixed unit 1 to step S11 and determines whether charging has started by referencing the signal D1. If charging has started, the CPU 101 sets a 10-second timer at step S12 and then executes step S13. Specifically, in step S13, the CPU 101 generates a control signal D2 for producing a synchronizing signal D3 and feeds it to the transistor 404 (FIG. 4). In step S14, the CPU 101 sees if the signal D2 has continuously appeared for 10 seconds. If the answer is negative, the program returns to step S13 and, if it is positive, the program advances to step S15. In step S15, the CPU 101 generates a control signal D2 having a continuous high level. Step S15 is followed by step S16 for deciding whether the charging has finished on the basis of the detect signal D1. If the charging is continuing, the program returns to step S15 and, if it has finished, the program returns to step S11.

Figure 8:
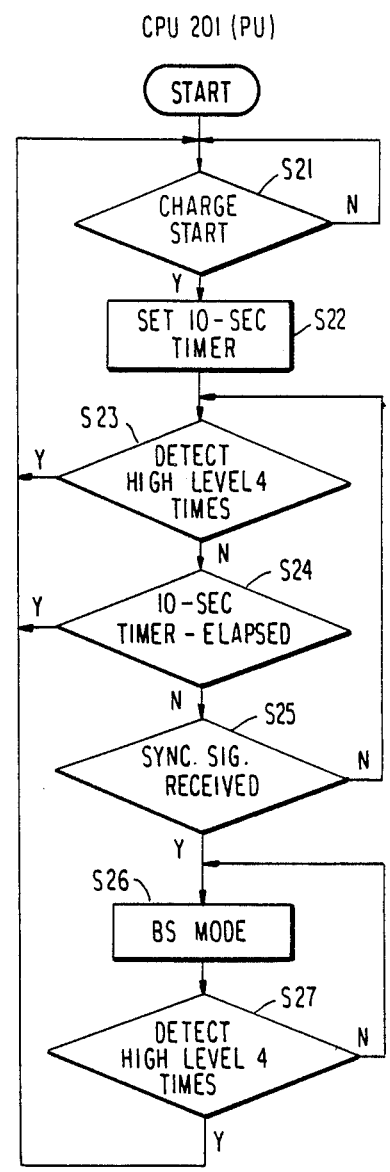
FIG. 8 is a flowchart demonstrating the operation of a CPU which is included in the portable unit of FIG. 3.

The operation of the CPU 201 installed in the portable unit 2 will now be described in detail with reference to FIG. 8. As shown, the program begins in a waiting condition of the portable unit 1. In step S21, the CPU 201 determines whether charging has begun by seeing if the synchronizing signal D3 has a high level, i.e., if the collector voltage of the transistor 51 (FIG. 5) has a low level. When determined that charging has begun, the CPU 201 advances to step S22 for setting a 10-seconds timer. Then, the CPU 201 samples the collector voltage of the transistor 51 at predetermined intervals (in the illustrative embodiment, an interval of 600 milliseconds at first and then intervals of 400 milliseconds). In step S23, if the CPU 201 detects the high level four consecutive times, it returns to step S21 deciding that charging has truly begun. If four consecutive high levels are not detected, the CPU 201 advances to step S24 to see if the 10-second timer has elapsed. If the result of decision is positive, the program returns to step S21 deciding that the portable unit 2 has been set in and charged by the separate charger 3 (FIG. 1).

On the other hand, if the 10-second timer has not elapsed as decided at step S24, the CPU 201 executes step S25 to determine whether the synchronizing signal D3 has been received. If the signal D3 has not been received, the CPU 201 returns to step S23. If it has been received, the CPU 201 executes step S26 for turning off the transmitter section 202, receiver section 203, and frequency synthesizer 204, thereby entering into a battery saving mode. Step S26 is followed by step S27 to see if the high level is detected four consecutive times. If the answer is negative, the program returns to step S26 deciding that charging is under way. If it is positive, the program returns to step S21 deciding that the charging condition has been cancelled.

As described above, the cordless telephone according to the present invention puts the portable unit in a battery saving mode when the battery of the portable unit is charged from the fixed unit. Therefore, the cordless telephone can not only save the battery of the portable unit but also shorten a charging time when the battery is charged from the fixed unit.

Various modifications will become possible for those skilled in the art after receiving the teaching of the present disclosure without departing from the scope thereof.

What is claimed is:

1. In a cordless telephone including a fixed unit and a portable unit which are communicatable with each other over a radio link,
    said portable unit comprising:
    rechargeable battery means; and
    battery saving means responsive to a control signal for interrupting power supply to predetermined sections of said portable unit;
    said fixed unit comprising:
    charging means for converting an AC voltage into a DC voltage to produce a charging voltage;
    detecting means for, when said battery means of said portable unit is charged by the charging voltage, detecting that said battery means is being charged and for outputting a detect signal; and
    supplying means responsive to said detect signal for outputting said control signal and for supplying said control signal to said portable unit together with said charging voltage.

2. A cordless telephone as claimed in claim 1, further comprising a charger independent of said fixed unit for converting an AC voltage into a DC voltage to produce a charging voltage for charging said battery means.

3. A cordless telephone as claimed in claim 1, wherein said predetermined sections of said portable unit comprises a transmitter section, a receiver section, and a frequency synthesizer.

4. A cordless telephone as claimed in claim 1, wherein said detecting means of said fixed unit comprises means for dividing said charging voltage, and comparing means for comparing the divided voltage with a reference voltage for outputting a high-level signal when said divided voltage is lower than said reference voltage, and wherein said supplying means comprises means responsive to said high-level signal for outputting an intermittent signal which continues for a predetermined period of time, and discontinuing means responsive to said intermittent signal for periodically discontinuing said charging voltage to produce said control signal.

5. A cordless telephone as claimed in claim 4, wherein said discontinuing means of said fixed unit comprises a first transistor which becomes conductive and non-conductive in response to said intermittent signal, and a second transistor turning on and off said charging voltage in response to respective conduction and non-conduction of said first transistor.

6. A cordless telephone as claimed in claim 4, wherein said battery saving means of said portable unit comprises charge detecting means responsive to said charging voltage periodically discontinued for outputting a second intermittent signal, and means responsive to said second intermittent signal for interrupting power supply to said predetermined sections.

7. A cordless telephone as claimed in claim 6, wherein said charge detecting means of said portable unit comprises a transistor which becomes conductive and non-conductive in response to said charging voltage periodically discontinued, and means for picking up a collector voltage of said transistor to output said collector voltage as said second intermittent signal.

8. A cordless telephone as claimed in claim 7, wherein said charge detecting means of said portable unit further comprises a limiter diode connected to a base of said transistor.

9. In a cordless telephone having a fixed unit and a portable unit which are communicatable with each other over a radio link,
said fixed unit comprising:
charging means for converting an AC voltage to supply a DC voltage;
first charge terminal means for supplying said DC voltage;
detecting means for detecting a change in said DC voltage appearing on said first charge terminal means; and
supplying means for supplying a control signal to said first charge terminal means in response to an output of said detecting means;
said portable unit comprising:
second charge terminal means connectable to said first charge terminal means;
battery means chargeable by said DC voltage which is supplied through said first and second charge terminal means; and
means for interrupting power supply to predetermined sections of said portable unit in response to said control signal which is fed through said first and second charge terminal means.

10. A cordless telephone as claimed in claim 9, wherein said control signal is produced by intermittently supplying said DC voltage for a predetermined period of time.

11. A cordless telephone comprising:
a fixed unit connected to an exchange by a subscriber line;
a portable unit communicable with said fixed unit over a radio link;
charging means for charging a rechargeable battery of said portable unit through charging terminals when said portable unit is set in said fixed unit;
detecting means included in said fixed unit for detecting charging of said battery to produce a detection signal;
control means responsive to said detection signal for sending a control signal through said charging terminals from said fixed unit to said portable unit; and
power interrupt means responsive to said control signal for interrupting power supply to predetermined sections of said portable unit.

12. A cordless telephone as claimed in claim 11, wherein said charging means comprises AC/DC converting means for converting an AC voltage into a DC voltage, and wherein said charging terminals comprise a first charge terminal and a second charge terminal respectively installed in said fixed unit and said portable unit which conduct said DC voltage to said battery, and wherein said detecting means comprises start detecting means connected to said first charge terminal for detecting a start of charging of said battery, and wherein said control means comprises means for outputting an intermittent signal in response to an output of said start detecting means, and means for periodically discontinuing said DC voltage in response to said intermittent signal, and wherein said power interrupt means comprises means for detecting said DC voltage periodically discontinued to output a power control signal, and means for interrupting power supply to said predetermined sections in response to said power control signal.

13. A cordless telephone as claimed in claim 11, wherein said fixed unit comprises a first transmitter section and a first receiver section each being connected to said exchange, and a first synthesizer section for delivering a predetermined local oscillation signal to each of said first transmitter section and said first receiver section, and wherein said portable unit comprises a second transmitter section and a second receiver section tunable to the same radio channel as said first transmitter section and said first receiver section, and a second synthesizer section for delivering a predetermined local oscillation signal to each of said second transmitter section and said second receiver section, and wherein said predetermined sections comprises said second transmitter section, said second receiver section, and said second synthesizer section.

14. In a cordless telephone including a portable unit having a control section which controls setting of operation modes including a battery saving mode and a battery, and a fixed unit connectable to said portable unit by radio and having a charging section for charging said battery when said portable unit is set in said portable unit,
said fixed unit comprising:
start detecting means for detecting that said charging section has started charging said battery; and
charge signal generating means for, when said start detecting means has detected a start of charging, superposing a charge signal on an output of said charging section;
said portable unit comprising charge signal detecting means for detecting said charge signal which is superposed on the output of said charging section of said fixed unit;

said control section conditioning said portable unit for said battery saving mode when said charge signal detecting means detects said charge signal.

15. A method of saving a rechargeable battery of a portable unit which is communicatable with a fixed unit by radio, comprising the steps of:
setting said portable unit in said fixed unit to charge said battery;
detecting charging of said battery at said fixed unit;
delivering a control signal from said fixed unit to said portable unit through charge terminals in response to detection of said charging of said battery; and
interrupting power supply to predetermined sections of said portable unit is response to said control signal.

16. A method as claimed in claim 15, wherein the step of delivering said control signal comprises the step of periodically discontinuing a voltage which is to charge said battery.

17. A method as claimed in claim 15, further comprising the step of setting said portable unit in a charger which is independent of said fixed unit to charge said battery.

18. A method of saving a rechargeable battery of a portable unit which is connectable by radio to a fixed unit which is connected to an exchange by a subscriber line, comprising the steps of:
charging said battery when said portable unit is connected to said fixed unit through charging terminals;
detecting charging of said battery at said fixed unit;
responsive to the detection of the charging, sending a control signal from said fixed unit to said portable unit through said charging terminals; and
responsive to said control signal, interrupting power supply to predetermined sections of said portable unit.

19. A method as claimed in claim 18, further comprising the steps of:
charging said battery by a charger which is independent of said fixed unit; and
establishing power supply to said predetermined sections when said charger is used to charge said battery.

20. A cordless telephone as claimed in claim 1, wherein said portable unit further comprises means, coupled to said rechargeable battery means, for indicating when said rechargeable battery means needs to be recharged.

21. A cordless telephone as claimed in claim 20, wherein said indicating means comprises a low-voltage detector, connected to said rechargeable battery means, for detecting a low voltage of the output of said rechargeable battery means, and for supplying a signal indicating that said rechargeable battery means needs to be recharged when the output voltage of said rechargeable battery means is below a predetermined low voltage.

22. A cordless telephone as claimed in claim 6, wherein said means for interrupting power supply to said predetermined sections comprises a central processing unit coupled to said charge detecting means, and power control means, coupled to said central processing unit and to said predetermined sections.

23. A method as claimed in claim 15, wherein said setting step further comprises the steps of converting an AC voltage to a DC voltage, and supplying the converted DC voltage as a charging voltage to said battery.

24. A method as claimed in claim 15, wherein said detecting step comprises the steps of: dividing a voltage which is proportional to a voltage used to charge said battery, comparing the divided voltage with a reference voltage, and outputting a signal indicating a result of said comparing step.

25. A method as claimed in claim 23, wherein said delivering step comprises outputting as said control signal an intermittent signal which continues for a predetermined period of time.

26. A method as claimed in claim 25, further comprising the step of: periodically discontinuing the charging of said battery in response to said intermittent signal to supply said control signal to said portable unit together with said charging voltage.

* * * * *

UNITED STATES PATENT AND TRADEMARK OFFICE
CERTIFICATE OF CORRECTION

PATENT NO. : 4,939,770

DATED : July 3, 1990

INVENTOR(S) : Masayuki Makino

It is certified that error appears in the above-identified patent and that said Letters Patent is hereby corrected as shown below:

Column 8, line 6, delete "u nit" and insert --unit--.

Column 9, line 14, delete "is" and insert --in--.

Signed and Sealed this

Tenth Day of September, 1991

Attest:

HARRY F. MANBECK, JR.

Attesting Officer

Commissioner of Patents and Trademarks